United States Patent
Simon et al.

(10) Patent No.: US 9,468,337 B2
(45) Date of Patent: Oct. 18, 2016

(54) HEATPROOF AND WATERPROOF COVER FOR BARBECUE GRILLS AND OTHER COOKING APPARATUS

(71) Applicant: Budge Industries, LLC, Lansdale, PA (US)

(72) Inventors: Charles B. Simon, Bethlehem, PA (US); James W. Thompson, Ambler, PA (US); Daniel B. Simon, Quakertown, PA (US)

(73) Assignee: Budge Industries, LLC, Lansdale, PA (US)

( * ) Notice: Subject to any disclaimer, the term of this patent is extended or adjusted under 35 U.S.C. 154(b) by 0 days.

(21) Appl. No.: 14/271,018

(22) Filed: May 6, 2014

(65) Prior Publication Data

US 2014/0326372 A1 Nov. 6, 2014

Related U.S. Application Data

(60) Provisional application No. 61/819,859, filed on May 6, 2013.

(51) Int. Cl.
  *B65D 65/02* (2006.01)
  *A47J 37/07* (2006.01)
  *A47J 36/06* (2006.01)

(52) U.S. Cl.
  CPC ............ *A47J 37/0786* (2013.01); *A47J 36/06* (2013.01)

(58) Field of Classification Search
  CPC .... A47J 37/07; A47J 37/086; A47J 37/0786; B65D 65/02
  USPC ................................. 150/154.165
  See application file for complete search history.

(56) References Cited

U.S. PATENT DOCUMENTS

| | | | | |
|---|---|---|---|---|
| 3,292,245 | A * | 12/1966 | Pfau ................. | B23K 9/0026 228/44.3 |
| 4,167,175 | A * | 9/1979 | Malafouris ......... | A47J 37/0786 126/25 C |
| 5,737,880 | A * | 4/1998 | Hayes ................ | A47J 37/0786 150/165 |
| 6,328,083 | B1 * | 12/2001 | Esterson ............. | A47J 37/0786 150/154 |
| 6,506,471 | B2 * | 1/2003 | Doppelt ............. | A62C 8/06 150/165 |
| D476,518 | S * | 7/2003 | Doppelt ............. | D6/610 |
| 6,863,100 | B2 * | 3/2005 | Neal ................... | A47J 37/0786 150/154 |
| 7,866,358 | B1 * | 1/2011 | Simms, II .......... | A47J 37/0786 126/201 |
| 2005/0205180 | A1 * | 9/2005 | Goudeau ............ | A47J 37/0786 150/154 |
| 2008/0210214 | A1 | 9/2008 | Wade | |
| 2009/0236019 | A1 * | 9/2009 | Maruzzo ............ | A47J 37/0786 150/154 |
| 2012/0266628 | A1 * | 10/2012 | Kieling .............. | A45C 3/001 62/457.2 |
| 2012/0285588 | A1 * | 11/2012 | Sheppard .......... | 150/166 |
| 2014/0113044 | A1 * | 4/2014 | McIntire ............ | A47J 37/0786 426/416 |

* cited by examiner

*Primary Examiner* — Sue A Weaver
(74) *Attorney, Agent, or Firm* — Mendelsohn Dunleavy, P.C.; Steve Mendelsohn; Yuri Gruzdkov

(57) ABSTRACT

A waterproof, heat-proof, and fire-proof protective cover for a hot barbecue grill or other cooking apparatus. In one embodiment, the protective cover includes a waterproof flexible outside shell conforming generally to the shape of the hot barbecue grill and having an underside, and at least one inside flexible shell coupled to the underside of the outside shell. The inside shell includes at least one heat-dissipating material disposed to contact a hot portion of the hot barbecue grill when the protective cover is placed thereon.

22 Claims, 7 Drawing Sheets

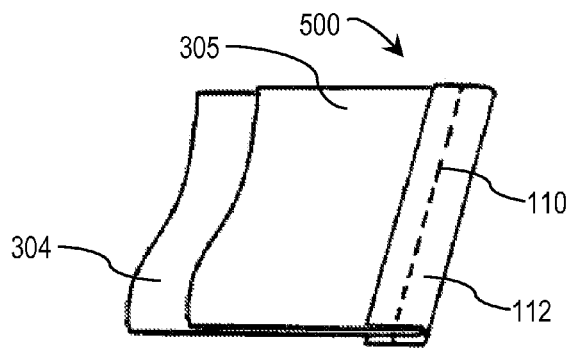
FIG. 5
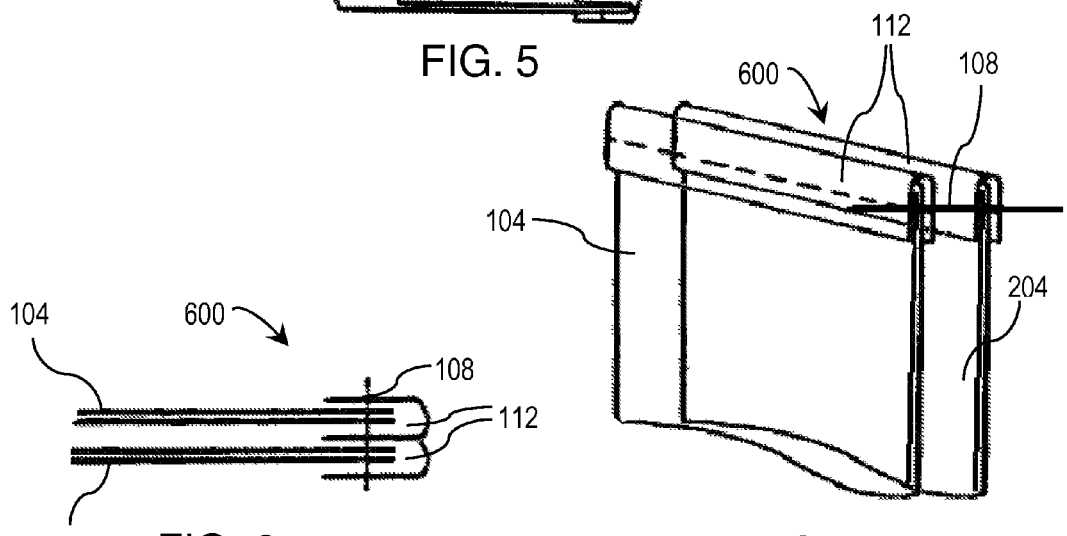
FIG. 6
FIG. 7
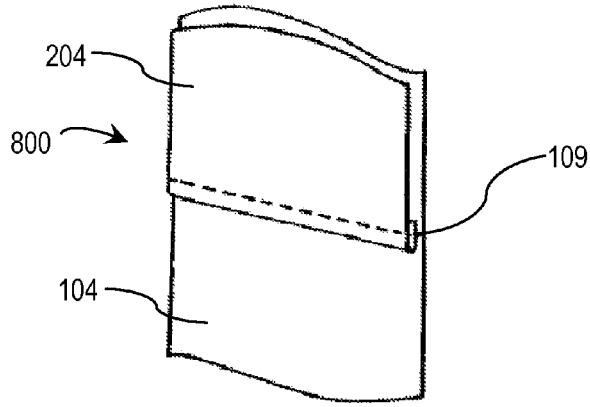
FIG. 8

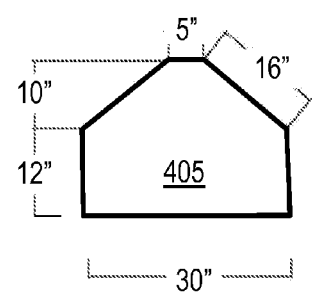
FIG. 12
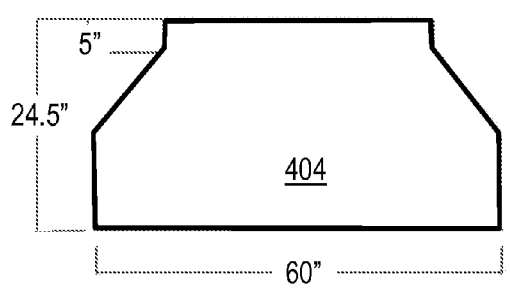
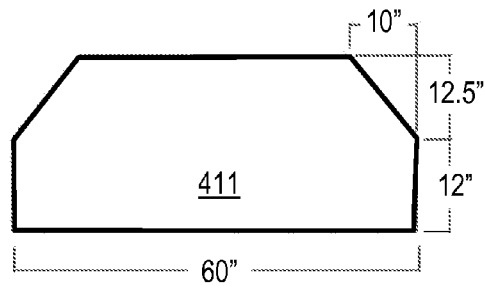
FIG. 13	FIG. 14

HEATPROOF AND WATERPROOF COVER FOR BARBECUE GRILLS AND OTHER COOKING APPARATUS

CROSS-REFERENCE TO RELATED APPLICATION

This application claims priority to U.S. Provisional Patent Application Ser. No. 61/819,859, filed May 6, 2013, the disclosure of which is incorporated herein by reference in its entirety.

BACKGROUND

The disclosure relates, generally, to cooking apparatus, and more particularly, to protective covering devices for barbecue grills and other cooking apparatus.

Conventional covers protect barbecue grills and other outdoor cooking apparatus against sun, rain, snow, dust, rodents, tree sap, spills, and the like.

After a barbecue grill has been used for cooking, a conventional protective cover can be placed over the grill only once the grill has cooled down to a temperature sufficient to avoid melting, deforming, or otherwise damaging the cover, or causing the cover to adhere to the grill.

SUMMARY

Embodiments of the present disclosure provide protective covers for use with barbecue grills fueled by propane, natural gas, and charcoal, as well as rotisseries, roasters, turkey fryers, seafood boilers, smokers, burners, and other indoor and other outdoor cooking apparatus. A protective cover consistent with embodiments of the disclosure can safely be applied to cover a hot grill or other cooking apparatus, immediately after the use of such apparatus for cooking.

In one embodiment, the disclosure provides a protective cover including a waterproof flexible outside shell having an underside, and at least one inside flexible shell coupled to the underside of the outside shell. The inside shell includes at least one heat-dissipating material.

In another embodiment, the disclosure provides a method for covering a hot cooking apparatus. The method includes: heating the cooking apparatus to a temperature used for cooking; and while the cooking apparatus is still at or near the temperature used for cooking, placing a protective cover on the cooking apparatus. The protective cover includes a waterproof flexible outside shell having an underside, and at least one inside flexible shell coupled to the underside of the outside shell. The inside shell includes at least one heat-dissipating material.

In a further embodiment, the disclosure provides a protective cover for a hot barbecue grill having at least one hot portion. The protective cover includes a waterproof flexible outside shell conforming generally to the shape of the hot barbecue grill and having an underside, and at least one inside flexible shell coupled to the underside of the outside shell. The inside shell includes at least one heat-dissipating material disposed to contact a hot portion of the hot barbecue grill when the protective cover is placed thereon.

BRIEF DESCRIPTION OF THE DRAWINGS

FIG. 5 shows a perspective view of a portion of an exemplary seam joining two individual sections of material of the outside shell, in the embodiment of FIG. 1;

FIG. 6 shows a cross-sectional view of a portion of one of the upper seams joining the front panel of the outside shell and the front panel of the inside shell, in the embodiment of FIG. 1;

FIG. 7 shows a slightly-exploded perspective view of the portion of the upper seam of FIG. 6;

FIG. 8 shows a perspective view of a portion of the lower seam joining the front panel of the outside shell and the front panel of the inside shell, in the embodiment of FIG. 1;

FIG. 12 shows exemplary dimensions for the side sections of the inside shell, in the embodiment of FIG. 1;

FIG. 13 shows exemplary dimensions for the front section of the inside shell, in the embodiment of FIG. 1;

FIG. 14 shows exemplary dimensions for the rear section of the inside shell, in the embodiment of FIG. 1;

DETAILED DESCRIPTION

Detailed illustrative embodiments of the present disclosure are disclosed herein. However, specific structural and functional details disclosed herein are merely representative for purposes of describing example embodiments of the present disclosure. Embodiments of the present disclosure may be embodied in many alternative forms and should not be construed as limited to only the embodiments set forth herein. Further, the terminology used herein is for the purpose of describing particular embodiments only and is not intended to be limiting of example embodiments of the disclosure.

Figure 1:
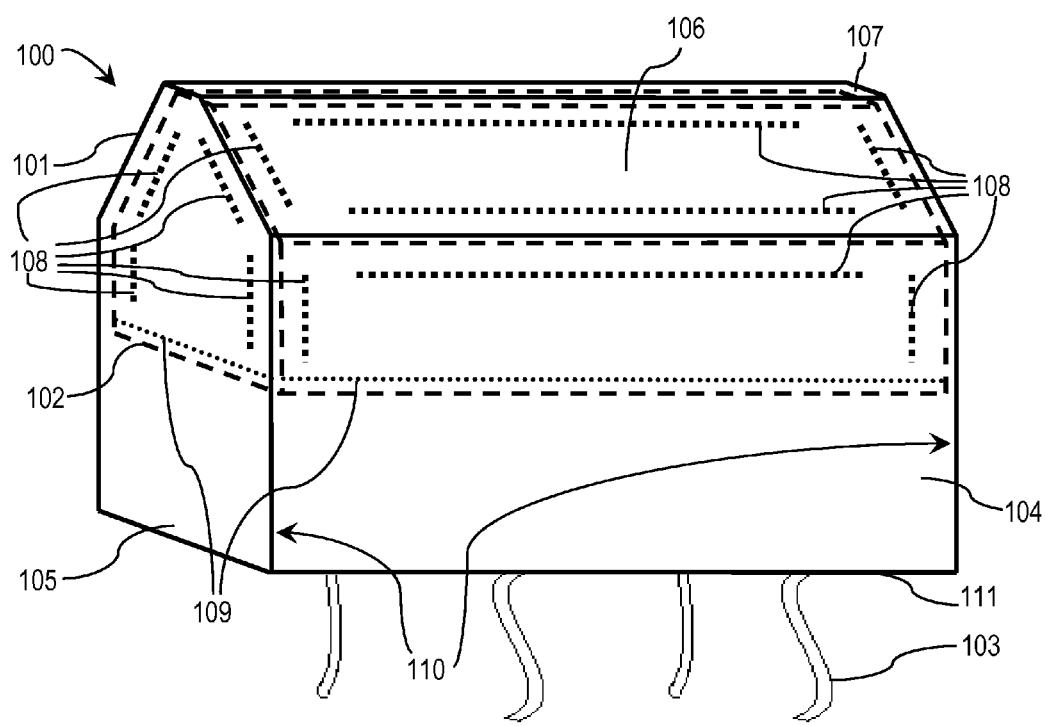
FIG. 1 shows a front perspective view of an exemplary protective cover consistent with a first embodiment of the disclosure, with hidden lines illustrating the inside shell and seams.

FIG. 1 shows a front perspective view of a protective cover 100 consistent with a first exemplary embodiment of the disclosure. In this embodiment, cover 100 is intended for use with a conventional cart-style barbecue grill up to 60 inches wide, including integral side burners and/or raised drop-leaf side tables or shelves.

As shown, cover 100 includes an outside shell 101 and an inside shell 102 (illustrated in dashed hidden lines) disposed within and joined to outside shell 101 by means of a plurality of individual upper seams 108 (illustrated in larger dotted hidden lines) and a continuous lower seam 109 (illustrated in smaller dotted hidden lines).

Outside shell 101 is constructed from polyester and/or nylon, with a waterproof inner coating (e.g., poly-acrylic, polyurethane, PEVA, PVC, or the like), although, in alternative embodiments, shell 101 may be constructed from another waterproof material. The material of outside shell 101 may be treated to be flame-resistant and fire-retardant (non-propagating) and self-extinguishing if accidently exposed to direct flame. Outside shell 101 is desirably flexible, although, in some embodiments, portions of outside shell 101 may be rigid.

Outside shell 101 includes a front panel 104, two side panels 105 (only one of which is visible in FIG. 1), a rear panel (not visible in the drawings), two sloping panels 106 (only one of which is visible in FIG. 1), and a top panel 107. Panels 104, 105, 106, and 107 are surfaces of an integral outside shell 101 formed by joining a plurality of sections of material via seams 110, as will be explained in further detail below.

Inside shell 102 is a baffle or felt-like blanket made from a heat-resistant and thermally-insulating material, such cover 100 does not melt or burn when applied to a hot grill, but rather, dissipates heat over a large surface area. "Felt-like" refers to a textile that is produced by matting, condensing, and pressing together fibers. However, inside shell 102 may include both woven and non-woven components. For example, one or more materials such as FR Rayon, Basofil® (BASF brand of preoxidized acrylonitrilefiber), Panox® (SGL Group brand of polyacrylonitrile fiber), Nomex® (DuPont brand of meta-aramid synthetic fiber), Kevlar® (DuPont brand of para-aramid synthetic fiber), other aramid fiber, asbestos, or the like, may be woven singularly or together in a blend to achieve sufficient heat-resistance and thermal-insulation. Other fibers that provide similar physical properties may be used. Inside shell 102 is constructed to have a degree of loft so that it can dissipate heat quickly and efficiently, for example, having a thickness of 3/16". Inside shell 102 is desirably flexible, although, in some embodiments, portions of inside shell 102 may be rigid.

Figure 2:
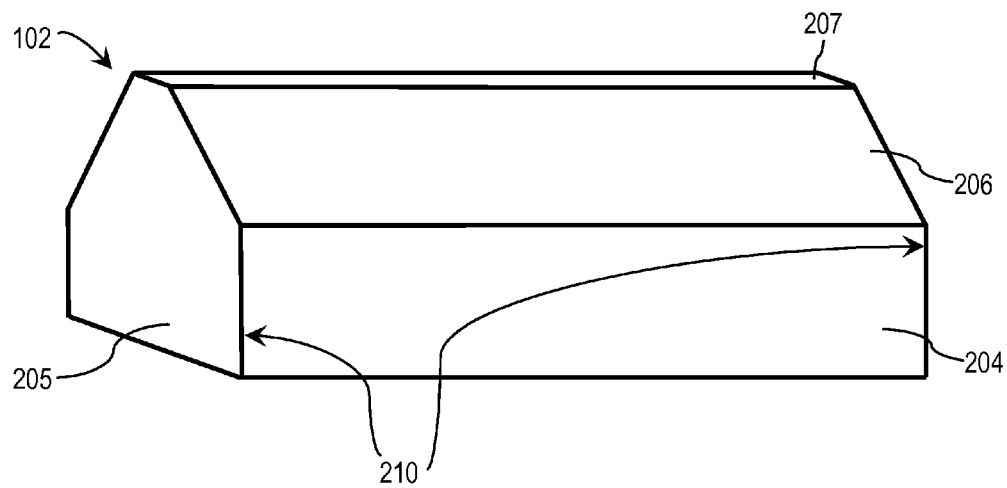
FIG. 2 shows a front perspective view of the inside shell of the protective cover, in the embodiment of FIG. 1.

As shown in FIG. 2, inside shell 102 includes a front panel 204, two side panels 205 (only one of which is visible in FIG. 2), a rear panel (not visible in the drawings), two sloping panels 206 (only one of which is visible in FIG. 1), and a top panel 207. Panels 204, 205, 206, and 207 are surfaces of an integral inside shell 102 formed by joining a plurality of sections of material via seams 210, as will be explained in further detail below.

Cover 100 includes straps 103 disposed at the hem 111 of cover 100 for fastening cover 100 around the grill. Straps 103 may include, e.g., hook-and-loop fastener, snaps, zippers, buckles, locks or other anti-theft devices, or the like. Alternatively or additionally, one or more cords, elastic members, locks or other anti-theft devices, or similar devices (not shown in the drawings) may be used at or near hem 111 to secure cover 100 and/or to create a snug fit around the grill.

Figure 3:
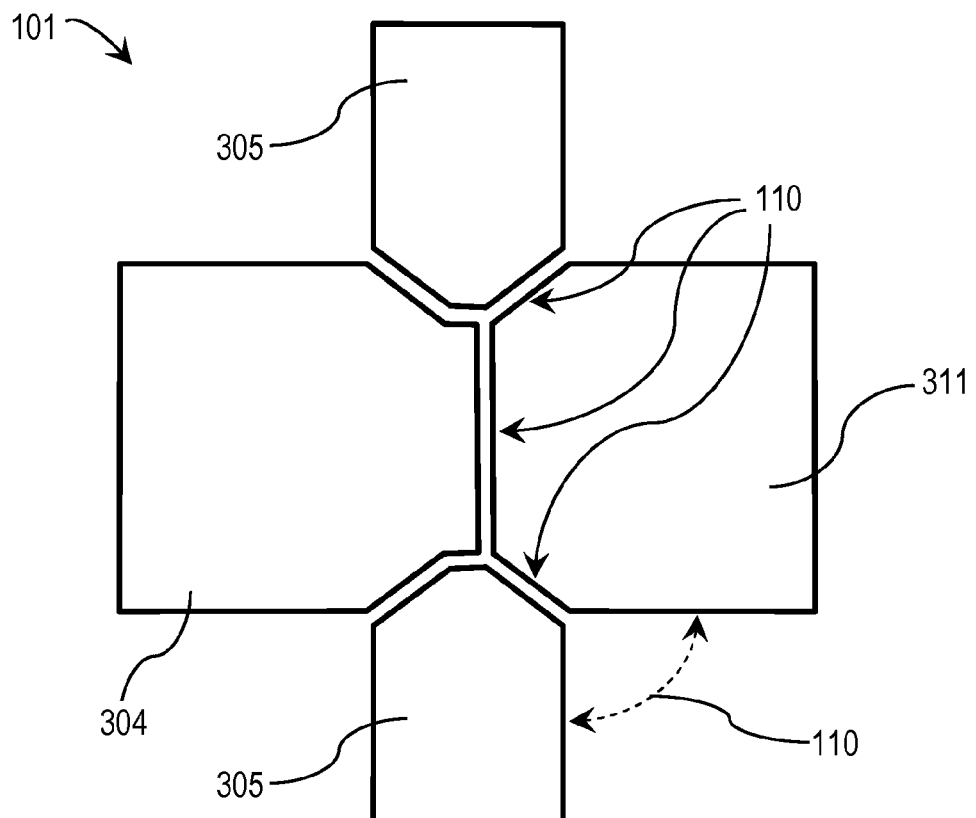
FIG. 3 shows a plan view of the four individual sections of material that are joined to form the outside shell of the protective cover, in the embodiment of FIG. 1.

FIG. 3 shows details of the construction of outside shell 101, which includes four individual sections of material joined together by means of seams 110. The individual sections include an irregular octagonal front section 304, two irregular hexagonal side sections 305, and an irregular hexagonal rear section 311. Sections 304, 305, and 311 are shown in FIG. 3 as being laid out in plan view, prior to being assembled by means of seams 110 to form outside shell 101 of protective cover 100. While only certain representative areas that are joined by seams 110 are indicated by arrows 110 in FIG. 3, it should be understood that seams 110 are, in fact, used (i) to join section 304 to sections 305, (ii) to join sections 304 and 311, and (iii) to join section 311 to sections 305. FIG. 5 shows a portion 500 of one such seam 110, which joins front section 304 with one of the side sections 305. In this embodiment, seams 110 are bound seams of type BSa-1, although other types of seams may be used in alternative embodiments. As shown in FIG. 5, each bound seam 110 is formed by folding binding strips 112 (or ribbon, braid, tape, or the like) over the edges of front section 304 and side section 305 and using a single-needle stitch to reinforce and finish the edges.

Figure 4:
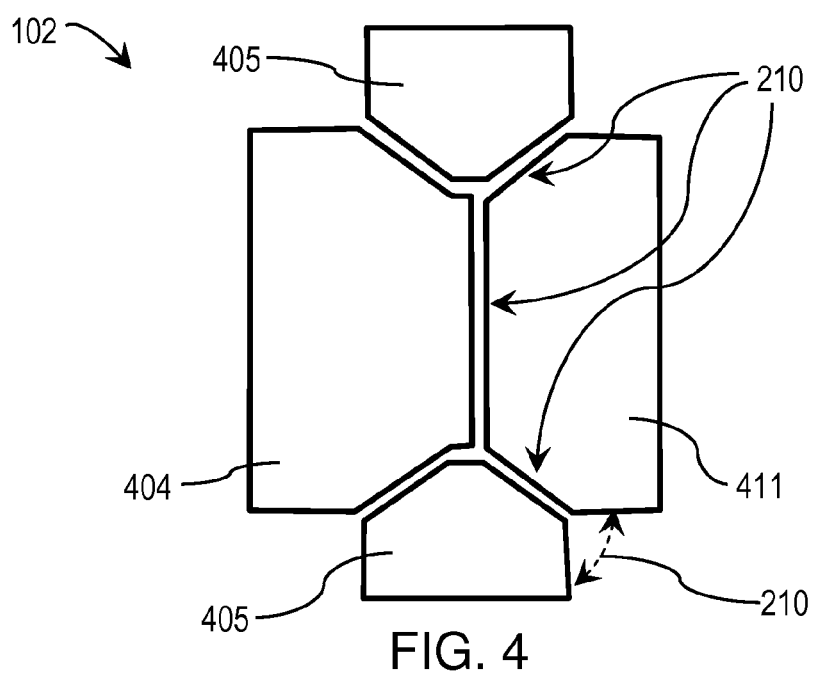
FIG. 4 shows a plan view of the four individual sections of material that are joined to form the inside shell of the protective cover, in the embodiment of FIG. 1.

FIG. 4 shows details of the construction of inside shell 102, which includes four individual sections of material joined together by means of seams 210. The individual sections include an irregular octagonal front section 404, two irregular hexagonal side sections 405, and an irregular hexagonal rear section 411. Sections 404, 405, and 411 are shown in FIG. 4 as being laid out in plan view, prior to being assembled by means of seams 210 to form inside shell 102 of protective cover 100. While only certain representative areas that are joined by seams 210 are indicated by arrows 210 in FIG. 4, it should be understood that seams 210 are, in fact, used (i) to join section 404 to sections 405, (ii) to join sections 404 and 411, and (iii) to join section 411 to sections 405. Seams 210 are substantially similar to seams 110, which are shown in further detail in FIG. 5, and, in this embodiment, are bound seams of type BSa-1, although other types of seams may be used in alternative embodiments.

FIGS. 6 and 7 show a portion 600 of one of upper seams 108, which joins front panel 104 of outside shell 101 with front panel 204 of inside shell 102. In this embodiment, seams 108 are single-needle bound seams of type BSa+BSa, although other types of seams may be used in alternative embodiments. As shown in FIG. 1, three seams 108 join front panel 104 to front panel 204, four seams 108 join each sloping panel 106 to a respective sloping panel 206 (although only one set of side panels 106, 206 is visible in FIG. 1), and four seams 108 join each side panel 105 to a respective side panel 205. Although not visible in FIG. 1, three seams 108 also join the rear panel of outside shell 101 with the rear panel of inside shell 102, in like manner to the three seams 108 that join front panels 104, 204. In this embodiment, to reduce labor and material costs, seams 108 do not extend to the edges and corners of the panels being joined, because the shorter lengths of seams 108 are sufficient to couple outside shell 101 securely to inside shell 102. However, in other embodiments, one or more seams 108 may extend all the way to their respective edges and/or corners.

FIG. 8 shows a portion 800 of lower seam 109, which is a continuous seam that joins outside shell 101 with inside shell 102. In this embodiment, lower seam 109 is a lapped seam of type LSd-1, although other types of seams may be used in alternative embodiments. As shown in FIG. 8, continuous lapped lower seam 109 is formed by folding in the edge of front panel 204 and using a single-needle stitch to join front panels 104, 204. Lower seam 109 is continuous because it traverses the entire width of front panel 104, side panels 105, and the rear panel (not shown) of outside shell 101, joining each of those panels to its respective counterpart panel of inside shell 102, namely, front panel 204, side panels 205, and the rear panel (not shown). Lower seam 109 encircles outside shell 101 and inside shell 102 and forms a seal between outside shell 101 and inside shell 102 to prevent the infiltration of dirt, moisture, food residue, and the like.

Although not shown in the drawings, hem 111, in this embodiment, is a bound seam of type BSa-1, although other types of seams may be used in alternative embodiments.

The thread used for seams 108, 109, 110 and hem 11 is a heat-resistant thread, such as one or more of Aramid®, Kevlar®, Nomex®, or the like.

In alternative embodiments, instead of employing seams with threads, one or more of seams 108, 109, 110 may be constructed using ultrasonic bonding, e.g., to create a waterproof cover. In this scenario, an ultrasonic bonding system may be employed, which includes an engraved anvil drum and an ultrasonic system with acoustic stack (e.g., converter, amplitude coupler, and sonotrode). The acoustic stack is mounted above the rotating anvil drum, leaving a small gap between the surface of the rotating anvil and the sonotrode. The sonotrode constantly expands and contracts (amplitude), e.g., at a rate of 20,000 times per second. As material passes through the gap, the material is subjected to force and amplitude. During the expansion cycle, sufficient compression is applied through the material against the raised bonding points of the anvil drum, which creates surface friction that melts the woven or nonwoven materials being bonded. During the contraction cycle, the gap increases, so that the material can move through the gap without jamming. The strength of the ultrasonic bond depends on based on the constantly-controlled speed of the material, the constant amplitude, and a consistent force applied to a specific anvil drum pattern.

It should be understood that the locations of the seams shown in FIG. 1 and the types of seams and bonding methods shown in FIGS. 5-8 are merely exemplary, and that other locations and types of seams and bonding methods may be used in alternative embodiments.

FIGS. 9-14 provide exemplary dimensions (in inches) for the sections of material for cover 100, which is intended for use with a cart-style barbecue grill up to 60 inches wide.

Figure 9:
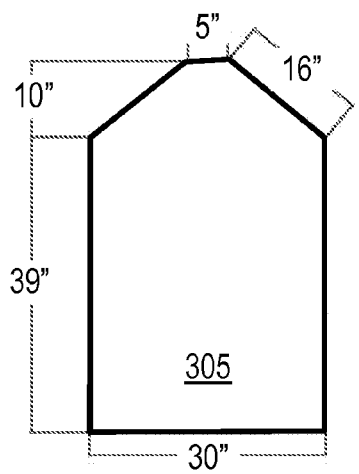
FIG. 9 shows exemplary dimensions for the side sections of the outside shell, in the embodiment of FIG. 1.
Figure 10:
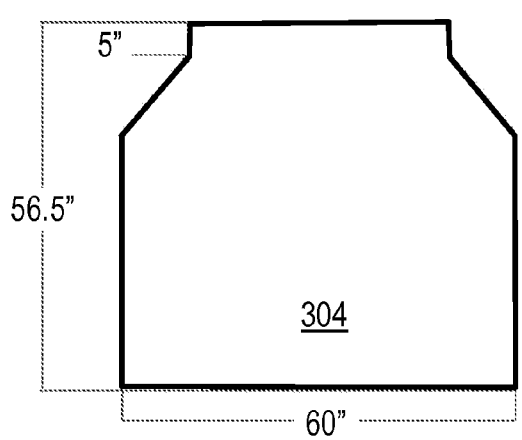
FIG. 10 shows exemplary dimensions for the front section of the outside shell, in the embodiment of FIG. 1.
Figure 11:
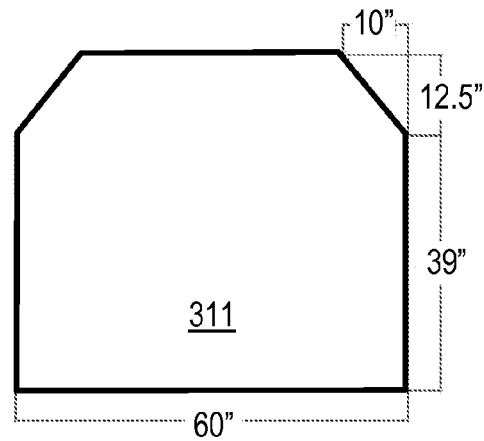
FIG. 11 shows exemplary dimensions for the rear section of the outside shell, in the embodiment of FIG. 1.

FIG. 9 shows exemplary dimensions for side sections 305 of outside shell 101. FIG. 10 shows exemplary dimensions for front section 304 of outside shell 101. FIG. 11 shows exemplary dimensions for rear section 311 of outside shell 101. FIG. 12 shows exemplary dimensions for side sections 405 of inside shell 102. FIG. 13 shows exemplary dimensions for front section 404 of inside shell 102. FIG. 14 shows exemplary dimensions for rear section 411 of inside shell 102.

Cover 100 can safely be applied to a hot grill immediately after cooking, without requiring the user to wait until the grill cools, and without risk of cover 100 melting or igniting. Although, in this embodiment, the grill cover is designed to fit a particular style of grill, it should be understood that a cover consistent with embodiments of the disclosure can alternatively be made in various sizes and shapes to fit other types of grills, as well as other cooking apparatus typically used outdoors, including, e.g., rotisseries, turkey fryers, seafood boilers, and the like, and that the term "grill," as used herein, should not be construed as limiting in any way.

Figure 15:
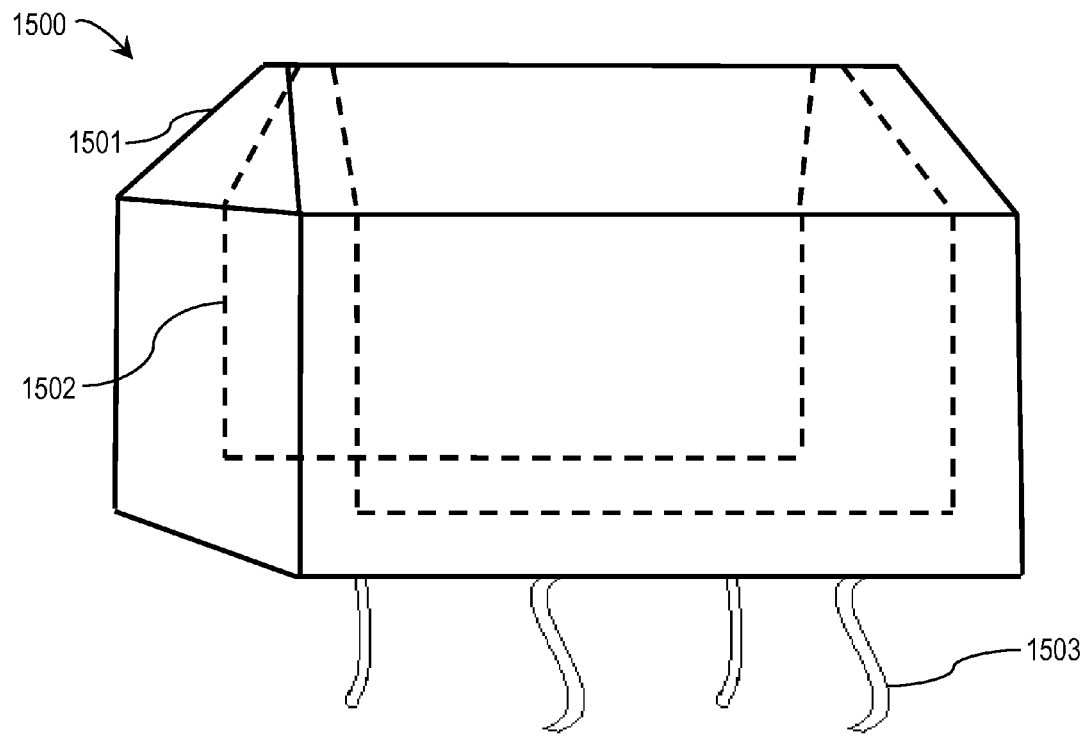
FIG. 15 shows a front perspective view of an exemplary protective cover consistent with a second embodiment of the disclosure, with hidden lines illustrating the inside shell.

FIG. 15 illustrates a front perspective view of a protective cover 1500 consistent with a second exemplary embodiment of the disclosure. Cover 1500 is similar to cover 100 described above and illustrated in FIGS. 1-14 and is intended for use with a conventional cart-style barbecue grill up to 65 inches wide, including integral side burners and/or raised drop-leaf side tables or shelves. Cover 1500 has a different construction from that of cover 100 and has an inside shell 1502 that has a different configuration from inside shell 102 of cover 100.

As shown, cover 1500 includes an outside shell 1501 and inside shell 1502 (illustrated in dashed hidden lines) disposed within and joined to outside shell 1501. Although all of the seams joining the various components of cover 1500 are not shown in the drawings, it should be understood that these seams are substantially similar to those of cover 100.

Figure 16:
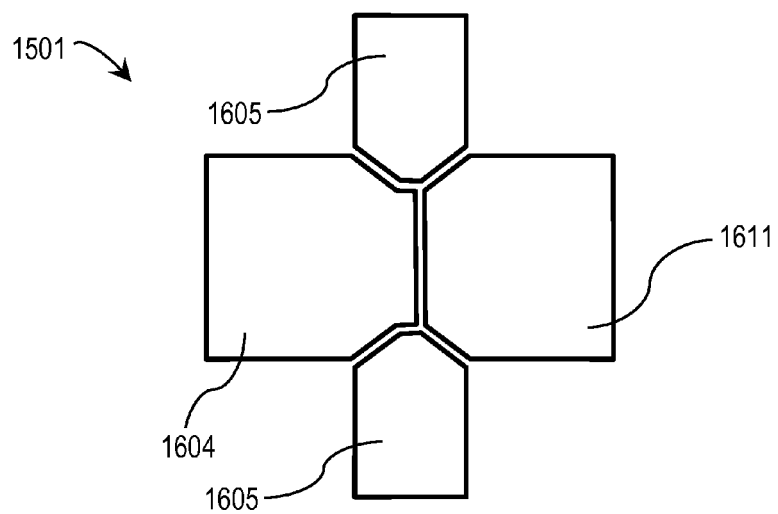
FIG. 16 shows a plan view of the four individual sections of material that are joined to form the outside shell of the protective cover, in the embodiment of FIG. 15.

FIG. 16 shows details of the construction of outside shell 1501, which includes four individual sections of material joined together by means of bound seams (not shown). The individual sections include an irregular octagonal front section 1604, two irregular hexagonal side sections 1605, and an irregular hexagonal rear section 1611. Sections 1604, 1605, and 1611 are shown in FIG. 16 as being laid out in plan view, prior to being assembled by means of bound seams to form outside shell 1501 of protective cover 1500. In like manner to the bound seams used to join the sections of outside shell 301 shown in FIG. 3, bound seams are used (i) to join section 1604 to sections 1605, (ii) to join sections 1604 and 1611, and (iii) to join section 1611 to sections 1605.

Figure 17:
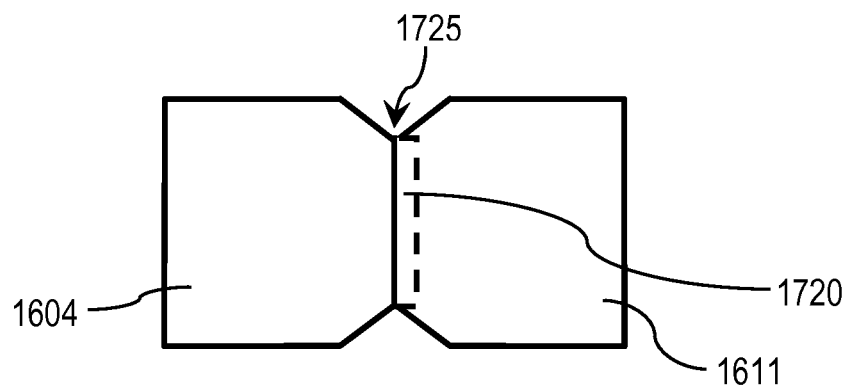
FIG. 17 shows an initial step of assembling a portion of the outside shell, in the embodiment of FIG. 15.

FIG. 17 shows an initial step of assembling a portion of outside shell 1501. As shown, sections 1604 and 1611 are joined by means of a bound seam 1725, such that a portion 1720 (illustrated in dashed hidden lines) of section 1604 overlaps with section 1611.

Figure 18:
FIG. 18 shows the inside shell, in the embodiment of FIG. 15.

FIG. 18 shows inside shell 1502, which, in this embodiment, is a single rectangular section of material.

Figure 19:
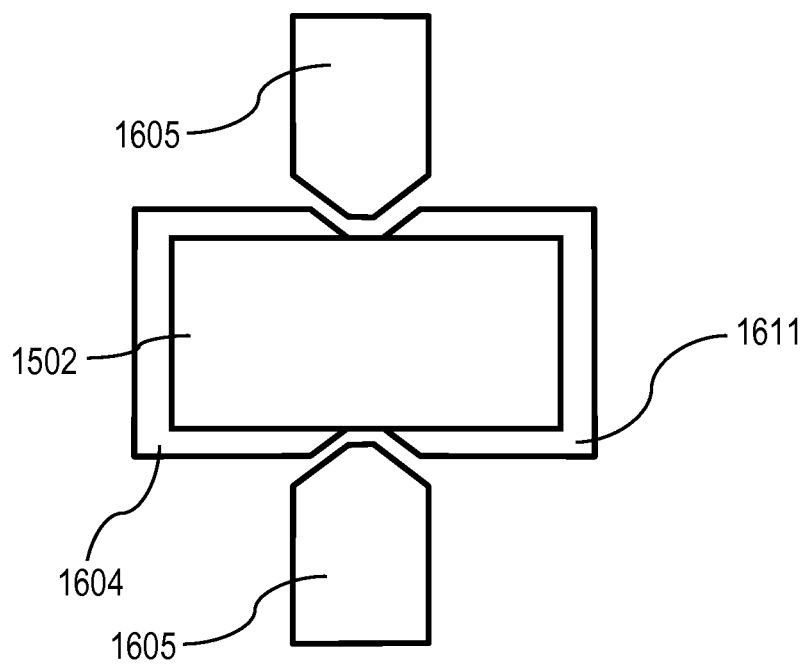
FIG. 19 shows a subsequent step of assembling the protective cover of FIG. 15.

As shown in FIG. 19, after sections 1604 and 1611 are joined (as shown in FIG. 17), inside shell 1502 is laid out on top of joined sections 1604 and 1611.

Next, inside shell 1502 is joined to sections 1604 and 1611 by means of one or more continuous, lapped seams (not shown). To complete the assembly of cover 1500, bound seams are then used to join sections 1604 and 1611 to sections 1605, in like manner to the seams used to join the sections of outside shell 301 shown in FIG. 3.

Alternatively, instead of employing one or more seams with threads, ultrasonic bonding may be used for one or more seams that join the various components of cover 1500.

As with cover 100, cover 1500 can safely be applied to a hot grill immediately after cooking, without requiring the user to wait until the grill cools, and without risk of cover 1500 melting or igniting. Since inside shell 1502 does not involve the assembly of multiple components, as is the case with panels 204, 205, 206, and 207 of cover 100, the construction of cover 1500 is simplified relative to that of cover 100, thus saving time and lowering manufacturing costs by reducing labor and materials used to construct cover 1500.

Although cover 100 and cover 1500 both include inside shells that are suitably sized and shaped and disposed in a region intended to contact hot portions of a grill being covered, it should be understood that, in alternative embodiments, the sizes, shapes, and locations of the inside shell may vary. In some alternative embodiments, multiple inside shells (each of which could be, e.g., a single section of material) may be used within an outside shell, where the inside shells are disposed at different locations within the underside of the outside shell that are intended to contact hot portions of a grill being covered.

Although embodiments of the disclosure are described as being used in connection with cooking apparatus, it should be understood that a protective cover consistent with embodiments of the disclosure may alternatively be used as a heatproof and/or waterproof protective cover for other items.

It should be understood that various changes in the details, materials, and arrangements of the parts which have been described and illustrated in order to explain the nature of this disclosure may be made by those skilled in the art without departing from the scope of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments.

Although the disclosure has been described using relative terms such as "front," "back," "side," "top," "bottom," "over," "above," "under" and the like in the description and in the claims, such terms are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Although the disclosure has been set forth in terms of the exemplary embodiments described herein and illustrated in the attached drawings, it is to be understood that such disclosure is purely illustrative and is not to be interpreted as limiting. Consequently, various alterations, modifications, and/or alternative embodiments and applications may be suggested to those skilled in the art after having read this disclosure. Accordingly, it is intended that the disclosure be interpreted as encompassing all alterations, modifications, or alternative embodiments and applications as fall within the true spirit and scope of this disclosure.

It will be further understood that various changes in the details, materials, and arrangements of the parts which have been described and illustrated in order to explain the nature of this disclosure may be made by those skilled in the art without departing from the scope of the disclosure as expressed in the following claims.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A protective cover for a cooking apparatus, the protective cover comprising:
    a waterproof flexible outside shell conforming generally to a shape of the cooking apparatus and having an underside, wherein the waterproof flexible outside shell includes two or more waterproof flexible panels;
    a flexible inside shell coupled to the underside of the waterproof flexible outside shell, the flexible inside shell comprising at least one heat-resistant and thermally insulating material disposed to contact a hot portion of the cooking apparatus when the protective cover is placed thereon, wherein the flexible inside shell includes two or more flexible panels that comprise the at least one heat-resistant and thermally insulating material;
    a plurality of first seams, wherein each of said first seams joins together respective two of the two or more waterproof flexible panels of the waterproof flexible outside shell; and
    a plurality of second seams, wherein each of said second seams joins together respective two of the two or more flexible panels of the flexible inside shell.

2. The protective cover of claim 1, wherein the flexible inside shell is configured to prevent the protective cover from melting and burning when in contact with the hot portion.

3. The protective cover of claim 2, wherein the flexible inside shell is further configured to cause the protective cover to dissipate heat from the hot portion over a surface area larger than a surface area corresponding to the hot portion.

4. The protective cover of claim 2, wherein the at least one heat-resistant and thermally insulating material includes a felt-like material.

5. The protective cover of claim 2, wherein the at least one heat-resistant and thermally insulating material includes one or more of: FR Rayon, preoxidized acrylonitrilefiber, polyacrylonitrile fiber, meta-aramid synthetic fiber, para-aramid synthetic fiber, another aramid fiber, and asbestos.

6. The protective cover of claim 2, wherein the flexible inside shell comprises one or more materials woven singularly or together.

7. The protective cover of claim 2, wherein the waterproof flexible outside shell comprises one or more of polyester and nylon.

8. The protective cover of claim 7, wherein the waterproof flexible outside shell has a waterproof inner coating.

9. The protective cover of claim 7, wherein the waterproof flexible outside shell is flame-resistant or fire-retarding, or both flame-resistant and fire-retarding.

10. The protective cover of claim 7, wherein the outside shell comprises at least a front panel, two side panels, a rear panel, and two sloping panels coupled between the front panel, the two side panels, and the rear panel.

11. The protective cover of claim 1, wherein the protective cover is configured to be placed on the cooking apparatus while the cooking apparatus is still at or near a temperature used for cooking.

12. The protective cover of claim 1, wherein the at least one heat-resistant and thermally insulating material includes a felt-like material.

13. The protective cover of claim 1, wherein the at least one heat-resistant and thermally insulating material includes one or more of: FR Rayon, preoxidized acrylonitrilefiber, polyacrylonitrile fiber, meta-aramid synthetic fiber, para-aramid synthetic fiber, another aramid fiber, and asbestos.

14. The protective cover of claim 1, wherein the cooking apparatus is one of: a barbeque grill, a rotisserie, a fryer, and a boiler.

15. The protective cover of claim 1,
wherein the flexible inside shell is configured to prevent the protective cover from melting and burning when in contact with the hot portion and to cause the protective cover to dissipate heat from the hot portion over a surface area larger than a surface area corresponding to the hot portion;
wherein the hot portion corresponds to the cooking apparatus being at or near a temperature used for cooking;
wherein the waterproof flexible outside shell has a waterproof inner coating and is flame-resistant or fire-retarding, or both flame-resistant and fire-retarding;
wherein the waterproof flexible outside shell comprises at least a front panel, two side panels, a rear panel, and two sloping panels coupled between the front panel, the two side panels, and the rear panel;
wherein the protective cover is configured to be placed on the cooking apparatus while the cooking apparatus is still at or near a temperature used for cooking; and
wherein the cooking apparatus is one of: a barbeque grill, a rotisserie, a fryer, and a boiler.

16. The protective cover of claim 1, further comprising a plurality of third seams, wherein each of said third seams joins together a respective one of the two or more waterproof flexible panels of the waterproof flexible outside shell and a respective one of the two or more flexible panels of the flexible inside shell.

17. The protective cover of claim 16, wherein the plurality of third seams joins the flexible inside shell to the waterproof flexible outside shell in a manner that leaves an air gap between the flexible inside shell and the waterproof flexible outside shell.

18. The protective cover of claim 17, wherein the plurality of third seams includes a seam that forms a seal between the flexible inside shell and the waterproof flexible outside shell to prevent infiltration of extraneous substances into the air gap.

19. The protective cover of claim 17, wherein the plurality of third seams includes a seam that stitches together an edge of the respective one of the two or more flexible panels of the flexible inside shell and a middle portion of the respective one of the two or more waterproof flexible panels of the waterproof flexible outside shell.

20. The protective cover of claim 16,
wherein the two or more waterproof flexible panels of the waterproof flexible outside shell include at least a front panel, a first side panel, a second side panel, and a rear panel; and
wherein the two or more flexible panels of the flexible inside shell include at least:
a respective front panel that is joined by one or more of the third seams to the front panel of the waterproof flexible outside shell;
a respective first side panel that is joined by one or more of the third seams to the first side panel of the waterproof flexible outside shell;
a respective second side panel that is joined by one or more of the third seams to the second side panel of the waterproof flexible outside shell; and
a respective rear panel that is joined by one or more of the third seams to the rear panel of the waterproof flexible outside shell.

21. A method of protecting a cooking apparatus, the method comprising:
providing a protective cover to be placed on the cooking apparatus while the cooking apparatus is at or near a temperature used for cooking, wherein the protective cover comprises:
a waterproof flexible outside shell conforming generally to a shape of the cooking apparatus and having an underside, wherein the waterproof flexible outside shell includes two or more waterproof flexible panels;
a flexible inside shell coupled to the underside of the waterproof flexible outside shell, the flexible inside shell comprising at least one heat-resistant and thermally insulating material disposed to contact a hot portion of the cooking apparatus when the protective cover is placed thereon, wherein the flexible inside shell includes two or more flexible panels that comprise the at least one heat-resistant and thermally insulating material;
a plurality of first seams, wherein each of said first seams joins together respective two of the two or more waterproof flexible panels of the waterproof flexible outside shell; and
a plurality of second seams, wherein each of said second seams joins together respective two of the two or more flexible panels of the flexible inside shell.

22. The method of claim 21, further comprising placing the protective cover on the cooking apparatus while the cooking apparatus is at or near the temperature used for cooking.

* * * * *